United States Patent
Yap et al.

(10) Patent No.: US 7,974,347 B2
(45) Date of Patent: Jul. 5, 2011

(54) AUTOMATING INTERVAL SELECTION BASED ON RANGE AND SIZE OF DISPLAY AREA

(75) Inventors: Stefan Yap, Phillips Ranch, CA (US); David Peh, Rowland Heights, CA (US)

(73) Assignee: Oracle America, Inc., Redwood City, CA (US)

( * ) Notice: Subject to any disclaimer, the term of this patent is extended or adjusted under 35 U.S.C. 154(b) by 1503 days.

(21) Appl. No.: 11/388,299

(22) Filed: Mar. 24, 2006

(65) Prior Publication Data

US 2007/0226626 A1 Sep. 27, 2007

(51) Int. Cl.
*H04B 1/66* (2006.01)
*H04N 7/12* (2006.01)
*H04N 11/02* (2006.01)
*H04N 11/04* (2006.01)

(52) U.S. Cl. ............. 375/240.21; 375/240.01; 345/30; 345/51

(58) Field of Classification Search ............. 375/240.01; 345/30, 51
See application file for complete search history.

(56) References Cited

U.S. PATENT DOCUMENTS

2002/0032696 A1 * 3/2002 Takiguchi et al. .......... 707/500.1
2004/0225530 A1 * 11/2004 Bell et al. .......................... 705/2

* cited by examiner

*Primary Examiner* — Curtis B Odom
(74) *Attorney, Agent, or Firm* — Osha • Liang LLP (57) ABSTRACT

A mechanism for automatically determining an optimal temporal interval for displaying data is provided. The mechanism receives information indicating a temporal range. The mechanism determines the size of a display area in which data corresponding to the temporal range is to be displayed. The mechanism further determines, based at least partially upon the size of the display area, how many data display elements can be displayed within the first display area. The mechanism then determines, based at least partially upon the temporal range and how many data display elements can be displayed within the display area, a temporal interval by which the temporal range is to be divided for purposes of displaying the data corresponding to the temporal range. Each data display element corresponds to a particular instance of temporal interval.

8 Claims, 4 Drawing Sheets

AUTOMATING INTERVAL SELECTION BASED ON RANGE AND SIZE OF DISPLAY AREA

BACKGROUND

Composing charts for displaying data is a common task in many situations. For example, bar charts or line charts may illustrate the revenue of a company over time. Also, charts may be used to illustrate the increase or decrease of a population of a particular endangered species. In the Internet context, a user may access a website and, via a user interface, request a chart to be generated that indicates the change in the user's investments for a particular stock during a specific date-time range.

In order to generate a chart of data where one of the axes depicts, e.g. time, a charting mechanism will typically ask a user to input a date-time (i.e. temporal) range. For instance, in order to chart information that illustrates the average price of a particular stock over a period of time, the user may enter Jan. 1, 2006 as the start date and Mar. 1, 2007 as the end date. Various approaches may be implemented that determine a temporal interval (e.g. 1-day, 1-week, 2-week, etc.) in which data that "satisfies" the temporal range is aggregated. For example, given a one year temporal range and a temporal interval of one month, data will be grouped into twelve separate data display elements (e.g. a bar or a point on a chart) where each data display element corresponds to data associated with a different month of the year indicated by the temporal range.

One approach for determining an interval is to apply a fixed interval, meaning that the interval is always the same no matter what the user enters as the range. Therefore, in the above example, if the fixed temporal interval is one day, then there will be 425 intervals or data points to chart. This may be problematic. Many charting mechanisms output charting data to a small portion of a computer display, for example one quadrant of the computer display. This large number of data display elements may not fit within the display area. Even if the display area is the entire computer display, with 425 data points that must be displayed, it will be difficult for the user to distinguish one data point from another data point.

In another approach, rather than using a fixed interval no matter what range of values is entered, the user is prompted to enter an interval. In some situations, given a relatively straight-forward range (e.g. one year), a user may easily determine the interval (e.g. 1-month interval for a one year temporal range). However, many situations require the user to do non-trivial mental calculations.

For example, suppose that a user is interested in a temporal range where Mar. 5, 2006 is the start date and Apr. 23, 2006 is the end date. If the user chose a single day as the temporal interval, then the number of intervals would be 50, which may be too many depending on the size of the display area of the computer display. If the user chose one month or one week as the temporal interval, then either choice results in too few intervals (two intervals and eight intervals respectively) to illustrate sufficiently the change over time of what the data is representing (e.g. stock price change). Therefore, the user would have to choose either two, three, or four days as the temporal interval. Depending on the size of the display area, only one of the three possible temporal intervals may cause the charting mechanism to produce a chart that is useful (i.e. enough information is provided) and appropriate (i.e. not too much information is provided) to the user. In sum, requiring the user to enter a temporal interval results in the possibility that the user will choose many "wrong" temporal intervals before a "correct" temporal interval is chosen.

Because of these and potentially other drawbacks, the foregoing approaches do not provide wholly satisfactory results.

SUMMARY

A mechanism for automatically determining an interval for displaying data is provided herein. According to an embodiment, the mechanism receives information indicating a range of values. In one embodiment, the range of values is provided by a user. The mechanism further determines the size of a display area in which data corresponding to the range of values is to be displayed. The mechanism also determines, based at least partially upon the size of the display area, how many data display elements can be displayed within the first display area. The mechanism further determines, based at least partially upon the range of values and how many data display elements can be displayed within the display area, an interval by which the range of values is to be divided for purposes of displaying the data corresponding to the range of values.

In one embodiment, a maximum number of intervals is determined based on the size of the display area and a minimum visible pixel width. For each candidate interval in a set of candidate intervals, the range of values is divided by the candidate interval, where each result indicates how many data display elements can be displayed if the candidate interval is used as the interval. A candidate interval is selected that enables a highest number of data display elements to be displayed without exceeding the maximum.

DETAILED DESCRIPTION OF EMBODIMENT(S)

In the following description, for purposes of explanation, numerous specific details are set forth in order to provide a thorough understanding of the present invention. It will be apparent, however, that the present invention may be practiced without these specific details. In other instances, well-known structures and devices may be shown in block diagram form in order to avoid unnecessarily obscuring the present invention.

System Overview

Figure 1:
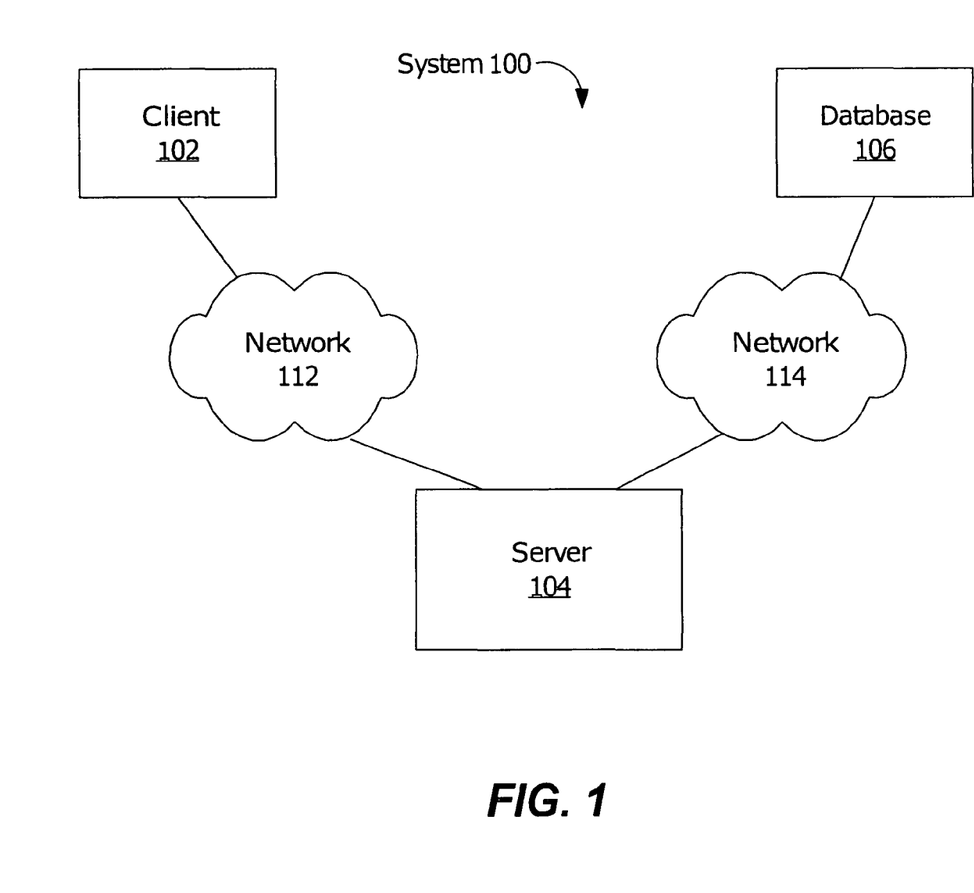
FIG. 1 shows a functional block diagram of a system in which one embodiment of the present invention may be implemented.

With reference to FIG. 1, there is shown a functional block diagram of a system in which one embodiment of the present invention may be implemented. As shown, the system 100 comprises a client 102, a server 104, a database 106 and networks 112-114. For the sake of simplicity, only one client 102, one server 104, and one database 106 are shown; however, there may be any number of clients 102, servers 104, and databases 106.

Client 102 represents a client machine executing a client application. The term "client" is generally used herein to refer to an application executing on a machine in the role of a client in a client/server communication architecture. For example, the machine may be a general purpose computer system, such as computer system 400 of FIG. 4. For other non-limiting examples, the machine may be any other device that is capable of rendering display pages (e.g. web pages) to a user, e.g., portable devices such as a PDA, mobile phone, and digital media device, and desktop or TV set-top devices. The machine is not limited and can vary from implementation to implementation, based on devices currently known as well as devices that may be developed in the future.

The client application may be any application that is capable of rendering display pages, such as web pages. The client may do so by interpreting and executing HTML and XML code. The manifestation of the client application is not limited and can vary from implementation to implementation, based on the application's ability to execute Web page programming languages currently known as well as programming languages that may be developed in the future. Because an application for rendering Web pages is currently most commonly referred to as a "Web browser" or simply a "browser", the client application is referred to hereinafter as a "browser."

Server 104 represents a server machine executing a server application. The term "server" is generally used herein to refer to an application executing on a machine in the role of a server in a client/server communication architecture. For example, the machine may be a general purpose computer system, such as computer system 400 of FIG. 4. The machine is not limited and can vary from implementation to implementation, based on devices currently known as well as devices that may be developed in the future.

The server application may be any application that is capable of serving content (e.g. web pages). The server application may do so by receiving client requests and responding with, for example, HTML and XML code, graphics, animations, multimedia, etc. The manifestation of the server application is not limited and can vary from implementation to implementation, based on the application's ability to serve Web pages in programming languages currently known as well as programming languages that may be developed in the future. The various references herein to server 104 does not limit the associated functionality to a single server 104. That is, different servers may actually perform different portions of the overall techniques described herein.

Database 106 represents a database management system executing on a machine. The term "database" is generally used herein to refer to an application executing on a machine in the role of a database in a server/database communication architecture. In another embodiment, database 106 executes on the same machine as server 104.

Networks 112 and 114 generally represent physical and logical infrastructures through which interconnected devices can intercommunicate, typically via common protocols such as TCP/IP, HTTP, IPSec, etc. For example, networks 112 and 114 may be the public Internet, over which the World Wide Web is implemented, or a private intranet such as a local or distributed private enterprise network. It is through network 112 that clients, such as client 102, transmit request messages to servers, such as server 104, that respond accordingly with Web pages or other digital data. It is through network 114 that servers, such as server 104, transmit queries to databases, such as database 106 that respond accordingly with stored data.

Networks 112 and 114 are not limited and can vary from implementation to implementation, based on the infrastructure's ability to facilitate request and response communications between clients and servers and between servers and databases, in suitable communication protocols currently known as well as communication protocols that may be developed in the future. Also, according to another embodiment, network 114 is not part of system 100. Instead, server 104 and database 106 are communicatively coupled directly with each other.

Functional Overview

According to one embodiment, a web browser executes on client 102. Client 102 accesses services provided by server 104 via the web browser. One of the services provided by server 104 is the ability to access data, such as the price of a particular stock, stored on database 106 for multiple users of server 104.

First, client 102 submits a request, via the web browser, indicating a temporal range, over network 112 in order to access price information for the particular stock during that temporal range. Second, server 104 receives the request and forwards the request to database 106 over network 114. Third, the query is received at database 106, which executes the query and returns the results to server 104 over network 114.

Fourth, server 104 receives the results and aggregates the results according to an "optimal" temporal interval based on one or more criteria. The step of determining a temporal interval may occur before or after database 106 is queried.

Lastly, server 104 returns the aggregated results to client 102 over network 112 to be displayed via the web browser. In this step, server 104 may invoke a charting mechanism that generates, based on the aggregated results, a chart. Server 104 then incorporates the chart into a web page that is returned to client 102 via the web browser.

In a similar situation, a user may have indicated a desire to sample data according to the temporal interval instead of requiring data corresponding to the entire temporal range. For example, a user's application may maintain price information for a particular stock for the previous twenty weeks. For each week that passes, the chart is updated to delete data corresponding to the last week and to insert data corresponding to the most recently transpired week. Thus, because stock price information is maintained on the client computer (e.g. client 102) or on a local server (e.g. server 104), a database (e.g. database 106) does not have to be queried to retrieve data corresponding to the entire range. For example, periodically server 104 may query database 106 only for data that corresponds to the most recent temporal interval. In that case, database 106 returns data corresponding to the most recent temporal interval and server 104 forwards the data to client 102.

It is not important which application or process in system 100 performs the steps of determining an optimal temporal interval, aggregating the results, and rendering the chart on client 102. For example, client 102 may contain all the logic and data for performing these individual steps.

Sample Chart

Figure 2:
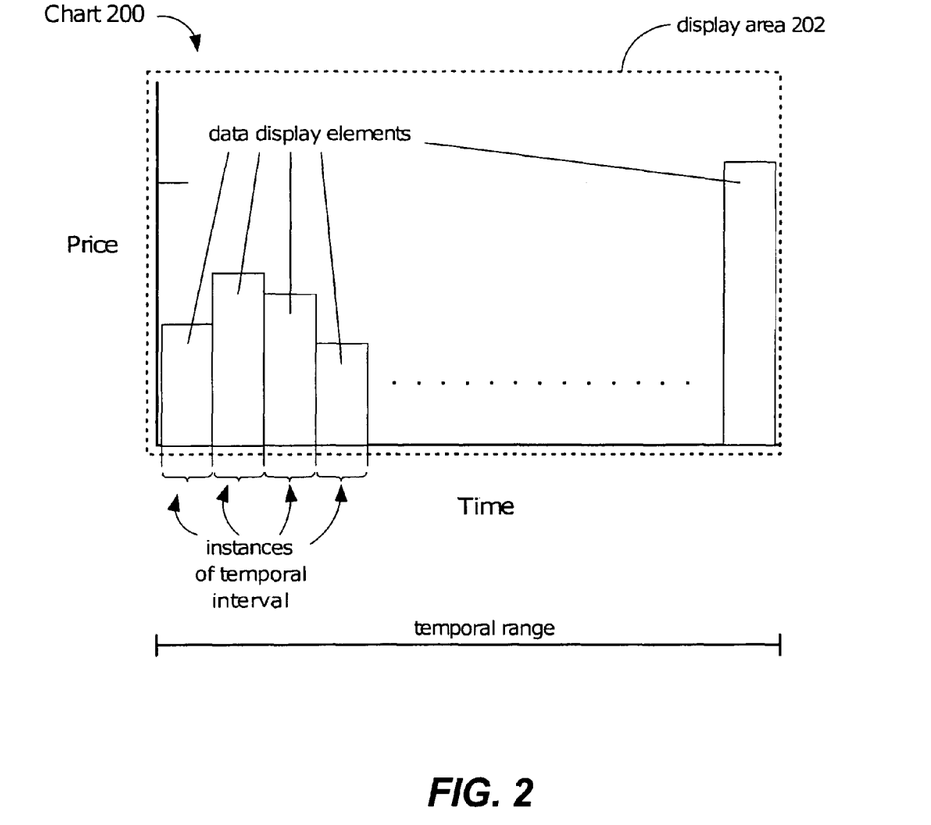
FIG. 2 shows a sample chart that illustrates a display area, temporal range, data display elements, and instances of temporal intervals, in accordance with an embodiment of the invention.

FIG. 2 shows a sample chart 200 that illustrates a display area 202, temporal range, data display elements, and instances of a temporal interval, in accordance with an embodiment of the invention. In this example, the x-axis of sample chart 200 corresponds to time and the y-axis corresponds to price, e.g. price of a particular stock. Sample chart 200 comprises display area 202 where multiple data display elements are displayed.

Embodiments of the invention are not limited to temporal ranges and temporal intervals. Other types of ranges may include a dollar amount (e.g. when determining an interval for the number of stocks within a specified price range) and any other type of numeric value that can be divided. However, for purposes of illustration, embodiments of the invention will refer to "temporal range" and "temporal interval."

As sample chart 200 shows, the period of time for which data is gathered and displayed is referred to as the temporal range. A temporal interval is used to divide the temporal range into multiple portions. Thus, within temporal range, there are multiple instances of the temporal interval. Each data display element corresponds to a particular instance of the temporal interval. A data display element, in this example, corresponds to the price of the particular stock during an instance of the temporal interval. For instance, if the temporal range is Jan. 1, 2006-Jan. 7, 2006 and the temporal interval is a single day, then the second instance of the temporal interval is the day Jan. 2, 2006.

A data display element may be a bar, as sample chart 200 depicts, or a point in a line graph where each point is connected with a line to a previous and a next consecutive point in the graph, if such a point exists, or any other type of display element. A data display element may take any form that can represent a particular value corresponding to a particular instance of a temporal interval.

Each data display element requires some space to display. The size of the display area and the amount of space required to display a particular data display element limits the number of data display elements that can fit within the display area. The number of data display elements may determine how many instances of the temporal interval there can be, which in turn determines how large the temporal interval should be. The temporal interval ultimately chosen is referred hereinafter as an "optimal temporal interval".

Determining an Optimal Temporal Interval

Figure 3:
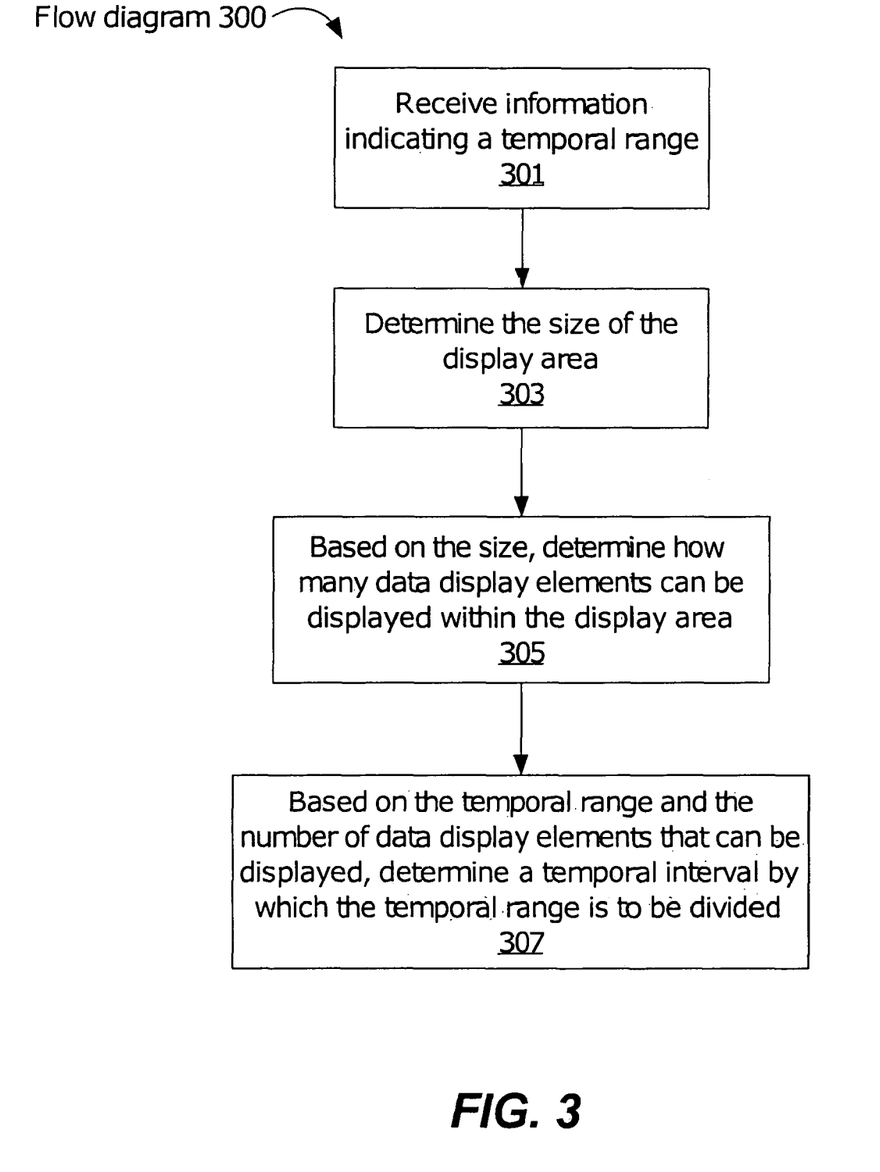
FIG. 3 shows a flow diagram for determining a temporal interval, in accordance with an embodiment of the invention.

According to an embodiment of the invention, in order to determine an optimal temporal interval (OTI or OI in the context of non-temporal ranges), a few pieces of information are first determined. FIG. 3 shows a flow diagram 300 for determining an OTI, in accordance with an embodiment of the invention.

At step 301, information indicating a temporal range is received, e.g. server 104 may receive the information from client 102 over network 112. At step 303, the size of the display area is determined. The display area is the area in which data (e.g. from database 106) that satisfies the temporal range will be rendered. At step 305, based on the size of the display area, the number of data display elements that can be displayed within the display area is determined. This may be done by dividing the size of the display area with a minimum visible pixel width (the size of a data display element). The minimum visible pixel width may be determined statically or dynamically at runtime. The minimum visible pixel width may be based on the user's computer display. The result of this operation is a maximum number of data display elements that can fit within the display area.

At step 307, an OTI is determined based at least partially upon the temporal range and how many data display elements can be displayed within the display area. This OTI is used to divide the temporal range for purposes of displaying data corresponding to the temporal range.

According to one embodiment, a set of candidate temporal intervals (CTIs or CIs in the context of non-temporal intervals) is maintained, from which an OTI is selected. It is likely that not all CTIs will be considered in determining an OTI. In fact, it is possible that only one CTI is considered before an OTI is determined.

In one embodiment, an OTI is determined by iterating through the set of candidate temporal intervals. Specifically, one of the candidate temporal intervals is selected. The temporal range is decomposed into the same unit of measure as the selected CTI and is divided by that CTI. In non-temporal contexts, the range may not need to be decomposed in to a different unit of measure if the range is, for example, in dollars.

The number resulting from dividing the range by the selected CTI represents how many instances of the selected CTI can fit within the range. This number is compared with the maximum number of data display elements that can fit within the display area. If this number is greater than the maximum, then the selected CTI cannot be used as the OTI. In such a case, another of the CTI's is selected. On the other hand, if this number is less than or equal to the maximum, then the selected CTI may be used as the OTI. The process of iterating through the set of candidate temporal intervals may begin from the smallest CTI to the largest CTI or from largest to smallest.

To illustrate how an OTI may be determined, reference will be made to an example. Suppose a user enters a valid temporal range, such as Jan. 1, 2006 02:30-Nov. 1, 2006 02:30. Suppose the temporal range is plotted on the x-axis of a chart and the width of the chart is 200 pixels. Further suppose that the minimum visible pixel width is 10 pixels. Thus, the maximum number of data display elements (and this the maximum number of temporal intervals) that can be displayed within the display area would then be 20 (200 pixels/10 pixels).

Suppose that the set of CTIs is the following:
1 minute
10 minute
15 minute
30 minute
1 hour
2 hour
6 hour
12 hour
1 day
2 day
1 week
2 week
3 week
1 month Other CTIs may be included in the set of CTIs, such as quarters, fortnights, etc.

If the optimal temporal interval is determined by iterating through the above set of CTIs from smallest to largest, then the temporal range described above (Jan. 1, 2006 02:30-Nov. 1, 2006 02:30) is converted into the following minute range:

$$60 \text{ minutes/hour} \times 24 \text{ hours/day} \times 304 \text{ days} = 437{,}760 \text{ minutes.}$$

This 437,760 minute range is divided by the 1-minute interval, which results in 437,760 intervals. Because 437,760 intervals is larger than the maximum number of intervals (20), the 1-minute interval cannot be used; thus, the 10-minute interval is considered. Dividing 437,760 by 10 results in 43,776. Because 43,776 is larger than 20, the 10-minute interval cannot be used; thus, the 15-minute interval is considered. This process continues through the remaining CTIs until the 1-hour interval is reached.

The temporal range is then converted into an hour range (i.e. 7296). This hour range is divided by the 1-hour interval, which results in 7296 intervals. Because 7296 intervals is larger than the maximum number of intervals (20), the 2-hour interval is considered. This process of dividing the hour range by the next CTI continues through the rest of the hour CTIs, as described above. This process also continues for the day range (dividing 304 days by the 1-day and 2-day intervals, respectively), until the 1-week interval is reached.

The temporal range is then converted into a week range (i.e. 43.43). This week range is divided by the 1-week interval, which results in 44 (43.43 rounding up) intervals. Because 44 is larger than the maximum number of intervals (20), the 1-week interval cannot be used; thus, the 2-week interval is considered. Dividing 44 by 2 results in 22. Because 22 is larger than 20, the 2-week interval cannot be used; thus, the 3-week interval is used as the next CTI. Dividing 44 by 3 weeks results in 15 (14.48 rounded up). Because 15 is less than 20 and because all previous CTIs resulted in more than 20 intervals, the 3-week interval is used as the OTI. This OTI is subsequently used to aggregate all the data associated with the temporal range or just the data associated with the latest temporal interval.

If the OTI is determined by iterating through the CTIs from largest interval to smallest interval and months is the largest unit of measure (as illustrated in the above list of CTIs), then the first range is a month range (i.e. 10 months). This month range is divided by the 1-month interval, which results in 10 intervals (10 months/1 month). Because the maximum number of intervals (20) has not yet been exceeded and no more month intervals remain to be considered, the temporal range is converted into a week range (43.43).

The 3-week interval is used as the next CTI, which results in 15 intervals (43.43 weeks/3 weeks=14.48 rounded up). Although the 15 intervals is also less than the maximum (20), the maximum number of intervals has still not been exceeded. Thus, the 2-week interval is then considered. Dividing 44 by 2 results in 22. Because the 2-week interval and all other CTIs not yet considered (i.e. 1-week to 1-minute) would result in more than 20 intervals, the 3-week interval is used as the OTI.

It is important to note that the number of calculations that occur in order to determine an OTI depends on whether the set of CTIs is iterated through from smallest to largest or largest to smallest, as the above example demonstrates. The order in which the set of CTIs is iterated through may be determined statically or dynamically by the system or by input from the user. Also, iteration may begin with a CTI somewhere in the middle of the list of CTIs and proceed toward to the largest or smallest CTI until an OTI is determined.

It is also important to note that, as the example above demonstrates, the temporal interval may not divide evenly into the OTI. There are at least two ways to handle such a situation. First, one of the data display elements may correspond to a longer temporal interval. For example, given the above OTI of 14.48 intervals, the last (i.e. $14^{th}$) temporal interval may correspond to the last 3 weeks and 10 days of the temporal range.

Or second, the data that falls into the "partial interval" may correspond to a separate data display element, as the example above suggests. For example, the last (i.e. $15^{th}$) temporal interval may correspond to the last 10 days of the temporal range.

Additional Embodiments

According to an embodiment, the process of determining an OTI may include choosing the largest "evenly factored" CTI, if one exists. For example, suppose the maximum number of intervals is 20. Further suppose that the temporal range spans 39 weeks. If two of the CTIs are the 2-week and 3-week intervals, then the number of intervals is 19.5 and 13, respectively. Because 19.5 is not evenly factored and the 3-week interval results in the largest evenly factored temporal interval (13), the 3-week interval is selected as the OTI.

However, in some situations, the largest evenly factored temporal interval does not exist. For example, suppose the maximum number of intervals is 20 and the temporal range spans 67 minutes. There is no minute interval that divides evenly into 67 and whose result is less than the maximum number of intervals. In such a case, a partial interval is necessary.

In one embodiment, the chart that is generated is to be generated in a new display area where the size of the new display area is different than the size of the original display area. Similar to the process described above, a new OTI is determined based at least partially on the temporal range, the size of the new display area, and how many data display elements can be displayed within the new display area. The new OTI may be the same OTI as the original OTI, or a different OTI.

In one embodiment, the user modifies the size of the original display area. A new OTI is generated using the same steps described above; namely, the new OTI is determined based at least partially on the temporal range, the size of the modified display area, and the number of data displays element that can be displayed within the modified display area. Again, the new OTI may be the same OTI as the original OTI, or a different OTI.

In one embodiment, a subset of CTIs is determined from the set of CTIs. Each CTI in the subset enables a number of data display elements to be displayed within the display area without exceeding the maximum. Before the data that is identified by the temporal range is sampled or aggregated by any of the CTIs, the user is prompted to select one of the CTIs from the subset. A chart where the OTI is selected by the user is generated and displayed. If the user wishes to view a chart with a different CTI, then the user may select a different CTI from the subset of CTIs.

Hardware Overview

Figure 4:
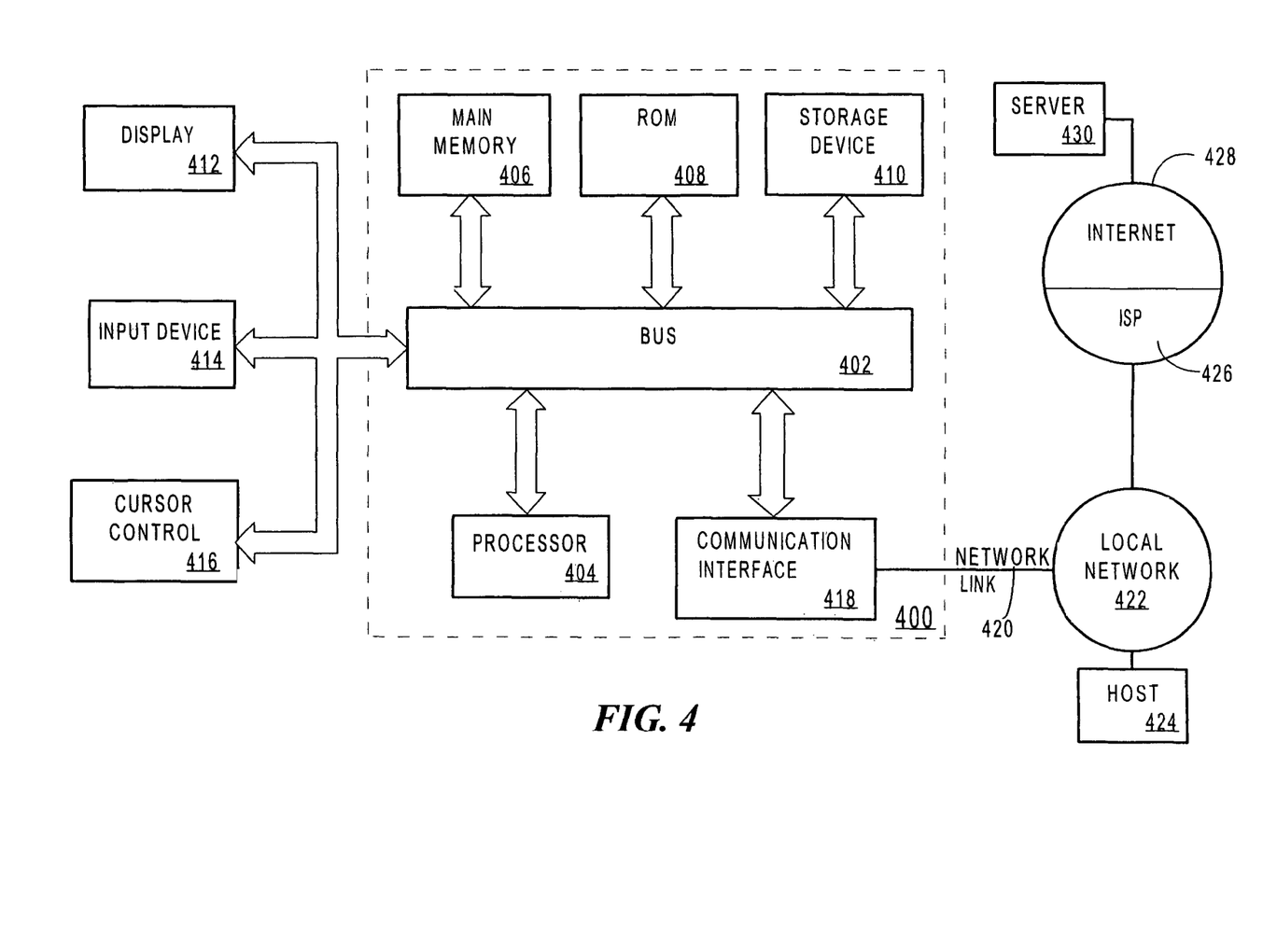
FIG. 4 is a block diagram of a general purpose computer system in which one embodiment of the present invention may be implemented.

In one embodiment, client 102, server 104, and database 106 may take the form of sets of instructions that are executed by one or more processors. If they take the form of sets of instructions, FIG. 4 shows a block diagram of a computer system 400 upon which these sets of instructions may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine-implemented method, comprising:
receiving information indicating a temporal range;
determining a size of a first display area in which data corresponding to the temporal range is to be displayed;
determining, based upon the size of the first display area, a maximum number of data display elements that can be displayed within the first display area; and
determining, based upon the temporal range, a list of candidate temporal intervals, and the maximum number of data display elements that can be displayed within the first display area, a first temporal interval by which the temporal range is to be divided for purposes of displaying the data corresponding to the temporal range,
wherein the temporal range comprises multiple instances of the first temporal interval,
wherein each data display element corresponds to one of the multiple instances of the first temporal interval,
wherein determining the first temporal interval comprises selecting a candidate temporal interval from the list of candidate temporal intervals by iterating through the list of candidate temporal intervals to identify the candidate temporal interval that enables a highest number of data display elements to be displayed within the first display area without exceeding the maximum, and using the candidate temporal interval as the first temporal interval and,
wherein the maximum is determined based on the size of the first display area and a minimum visible pixel width.

2. The method of claim 1, further comprising:
determining a size of a second display area in which data corresponding to the temporal range is to be displayed, wherein the size of the second display area is different from the size of the first display area;
determining, based upon the size of the second display area, a maximum number of data display elements that can be displayed within the second display area; and
determining, based upon the temporal range, a second list of candidate temporal intervals, and the maximum number of data display elements that can be displayed within the second display area, a second temporal interval by which the temporal range is to be divided for purposes of displaying the data corresponding to the temporal range, wherein the second temporal interval is different from the first temporal interval.

3. The method of claim 1, further comprising:
receiving information indicating that the size of the first display area has changed to a new size;
determining, based upon the new size, a second maximum number of data display elements that can be displayed within the first display area; and
determining, based upon the temporal range, a second list of candidate temporal intervals, and the second maximum number of data display elements that can be displayed within the first display area, a second temporal interval by which the temporal range is to be divided for purposes of displaying the data corresponding to the temporal range, wherein the second temporal interval is different from the first temporal interval.

4. The method of claim 1, further comprising:
receiving data corresponding to at least a particular instance of the first temporal interval of the temporal range;
aggregating the data corresponding to the particular instance of the first temporal interval to derive aggregated data; and
causing a particular data display element corresponding to the particular instance of the first temporal interval to be displayed within the first display area, wherein the particular data display element depicts the aggregated data.

5. A non-transitory machine-readable medium, comprising instructions for causing one or more processors to:
receive information indicating a temporal range;
determine a size of a first display area in which data corresponding to the temporal range is to be displayed;
determine, based upon the size of the first display area, a maximum number of data display elements that can be displayed within the first display area; and
determine, based upon the temporal range, a list of candidate temporal intervals, and the maximum number of data display elements that can be displayed within the first display area, a first temporal interval by which the temporal range is to be divided for purposes of displaying the data corresponding to the temporal range,
wherein the temporal range comprises multiple instances of the first temporal interval,
wherein each data display element corresponds to one of the multiple instances of the first temporal interval,
wherein determining the first temporal interval comprises selecting a candidate temporal interval from the list of candidate temporal intervals by iterating through the list of candidate temporal intervals to identify the candidate temporal interval that enables a highest number of data display elements to be displayed within the first display area without exceeding the maximum, and using the candidate temporal interval as the first temporal interval and,
wherein the maximum is determined based on the size of the first display area and a minimum visible pixel width.

6. The non-transitory medium of claim 5, further comprising instructions for causing one or more processors to:
determine a size of a second display area in which data corresponding to the temporal range is to be displayed, wherein the size of the second display area is different from the size of the first display area;
determine, based upon the size of the second display area, a maximum number of data display elements that can be displayed within the second display area; and
determine, based upon the temporal range, a second list of candidate temporal intervals, and the maximum number of data display elements that can be displayed within the second display area, a second temporal interval by which the temporal range is to be divided for purposes of displaying the data corresponding to the temporal range, wherein the second temporal interval is different from the first temporal interval.

7. The non-transitory medium of claim 5, further comprising instructions for causing one or more processors to:
receive information indicating that the size of the first display area has changed to a new size;
determine, based upon the new size, a second maximum number of data display elements that can be displayed within the first display area; and
determine, based upon the temporal range, a second list of candidate temporal intervals, and the second maximum number of data display elements that can be displayed within the first display area, a second temporal interval by which the temporal range is to be divided for purposes of displaying the data corresponding to the temporal range, wherein the second temporal interval is different from the first temporal interval.

8. The non-transitory medium of claim 5, further comprising instructions for causing one or more processors to:
receive data corresponding to at least a particular instance of the first temporal interval of the temporal range;
aggregate the data corresponding to the particular instance of the first temporal interval to derive aggregated data; and
cause a particular data display element corresponding to the particular instance of the first temporal interval to be displayed within the first display area, wherein the particular data display element depicts the aggregated data.

* * * * *